United States Patent
Dharmapurikar et al.

(10) Patent No.: US 10,305,799 B2
(45) Date of Patent: May 28, 2019

(54) RE-CONFIGURABLE LOOKUP PIPELINE ARCHITECTURE FOR PACKET FORWARDING

(71) Applicant: Cisco Technology, Inc., San Jose, CA (US)

(72) Inventors: Sarang Dharmapurikar, Cupertino, CA (US); Kit Chiu, Fremont, CA (US); Ganlin Wu, Palo Alto, CA (US); Alexandru Seibulescu, San Mateo, CA (US); Francisco Matus, Saratoga, CA (US); Wanli Wu, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 203 days.

(21) Appl. No.: 15/239,164

(22) Filed: Aug. 17, 2016

(65) Prior Publication Data

US 2018/0054385 A1 Feb. 22, 2018

(51) Int. Cl.
*H04L 12/741* (2013.01)
*H04L 29/06* (2006.01)
*H04L 12/935* (2013.01)

(52) U.S. Cl.
CPC .......... *H04L 45/74* (2013.01); *H04L 49/3063* (2013.01); *H04L 69/22* (2013.01)

(58) Field of Classification Search
CPC ...... H04L 45/74; H04L 49/3063; H04L 69/22
See application file for complete search history.

(56) References Cited

U.S. PATENT DOCUMENTS

| | | | |
|---|---|---|---|
| 7,940,755 B2 | 5/2011 | Estan et al. | |
| 8,020,163 B2 | 9/2011 | Nollet et al. | |
| 8,930,618 B2 | 1/2015 | Kumar et al. | |
| 9,231,865 B2 | 1/2016 | Sankaralingam et al. | |
| 9,525,419 B2 * | 12/2016 | Ngai | H03K 19/177 326/37 |
| 9,620,213 B2 * | 4/2017 | Tran | G11C 15/04 |

OTHER PUBLICATIONS

K. Mai et al., "Smart Memories: A Modular Reconfigurable Architecture", ISCA '00 Proceedings of the 27th Annual International Symposium on Computer Architecture, Jun. 10-14, 2000, Vancouver, British Columbia, Canada, ISBN: 1-58113-232-8, 11 pages.

* cited by examiner

*Primary Examiner* — Ian N Moore
*Assistant Examiner* — Justin T Van Roie
(74) *Attorney, Agent, or Firm* — Edell, Shapiro & Finnan, LLC

(57) ABSTRACT

Presented herein are techniques for performing packet forwarding or routing using a pipeline of a plurality of tiles. A method includes receiving a packet, parsing the packet to generate a vector, passing the vector to a first tile dedicated to a first type of lookup, performing a lookup in the first tile, storing a result of the first type of lookup in the vector to obtain a first updated vector, passing the first updated vector to a second tile dedicated to a second type of lookup, performing a lookup in the second tile, storing a result of the second type of lookup in the vector to obtain a second updated vector, and transmitting the packet from the network routing device via an output port thereof selected based on the second updated vector.

13 Claims, 10 Drawing Sheets

RE-CONFIGURABLE LOOKUP PIPELINE ARCHITECTURE FOR PACKET FORWARDING

TECHNICAL FIELD

The present disclosure relates to packet network devices, and more particularly to a pipeline architecture implemented with a series of tiles each configured with specialized functionality to enable efficient packet processing and forwarding.

BACKGROUND

Forwarding a packet in a switch or a router involves executing look-ups in a series of tables to obtain an output port for the packet and instructions to re-write packet headers. Typically, high-speed switching application specific integrated circuits (ASICs) use a pipelined architecture with dedicated on-chip resources for these lookup tables. However, such designs are rigid. For example, when the tables are unused, the on-chip resources cannot be used for other purposes.

Network processors allow flexible and efficient use of resources but operate relatively slowly compared to an ASIC. Some attempts have been made to bridge the gap between rigid ASICs and relatively slower network processors. For example, some architectures introduce "programmability" in the tables whereby any new protocol header can be parsed and looked up flexibly, and arbitrary actions can be performed on the packet at the same speed as an ASIC and with similar flexibility as network processors.

DESCRIPTION OF EXAMPLE EMBODIMENTS

Overview

A method is described herein including receiving a packet at an input port of a network routing device, parsing the packet to generate a lookup and result vector, passing the lookup and result vector to a first tile dedicated to a first type of lookup, performing a lookup in the first tile using information in the lookup and result vector, storing a result of the first type of lookup in the lookup and result vector to obtain a first updated lookup and result vector, passing the first updated lookup and result vector to a second tile dedicated to a second type of lookup, performing a lookup in the second tile using information in the first updated lookup and result vector, storing a result of the second type of lookup in the lookup and result vector to obtain a second updated lookup and result vector, performing a lookup in a third tile using, as a tag, information in the second updated lookup and result vector, storing a result of the third type of lookup in the lookup and result vector to obtain a third updated lookup and result vector, and transmitting the packet from the network routing device via an output port thereof selected based on the third updated lookup and result vector.

A device or apparatus in the form of, e.g., a network router or switch, is also presented and is configured to perform the operations of the described methodology.

Example Embodiments

Generalized programmability in forwarding ASICs may be useful where there may be a desire to deploy new protocols in the future that may not yet even exist. Such generalized programmability can also be useful to facilitate work-arounds for bugs when they are discovered in the field. However, there is resultant increased complexity and a significant cost of die area on a silicon chip when implementing generalized programmability. At the same time, efficiency may be more desirable than flexibility. For example, some users use a switch/router in a fashion that requires large media access control (MAC) tables but very small Internet protocol (IP) lookup table (for L2 switching). Other users need a large Longest Prefix Match table for routing but a small MAC table (e.g., for core routing). Still other users may require a large MAC table, a large Host Route Table but a smaller Longest Prefix Match table. Further, in addition to L2 and L3 lookups, there may also be a need to have tables for access control list (ACL) lookup or network address translation (NAT) that are relatively large and have the ability to scale with network size. With the foregoing in mind, embodiments described herein provide an architecture that is less "bulky" than a fully generally programmable ASIC, but can nevertheless perform pre-defined lookup functions while still allowing flexible partitioning of memory among the diverse lookup tables.

Figure 1:
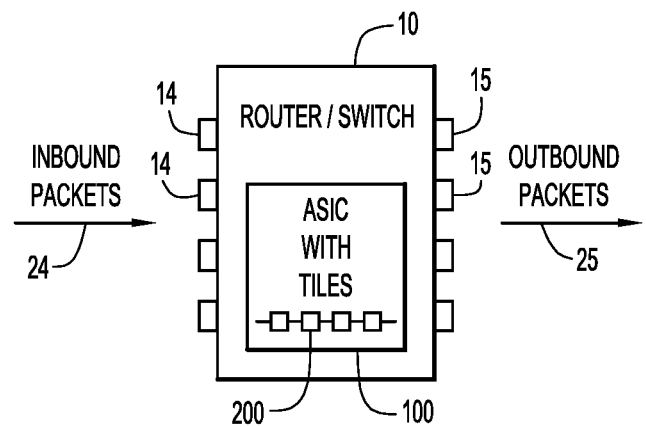
FIG. 1 depicts a router or switch in which an ASIC configured with tiles in accordance with an example embodiment may be deployed.

Reference is now made to FIG. 1, which depicts a router or switch (hereinafter "router") 10 in which an ASIC 100 configured with tiles 200 in accordance with an example embodiment may be deployed. Router 10 includes a plurality of in-bound ports 14 and outbound ports 15 via which inbounds packets 24 are received and via which outbound packets 25 are transmitted, respectively. The ASIC 100 (or other form of processor) performs all of the necessary look ups and packet manipulation to ensure that an inbound packet 24 received at an inbound port 14 is sent out of the appropriate outbound port 15 along with any portions of the packet re-written or augmented.

Figure 2:
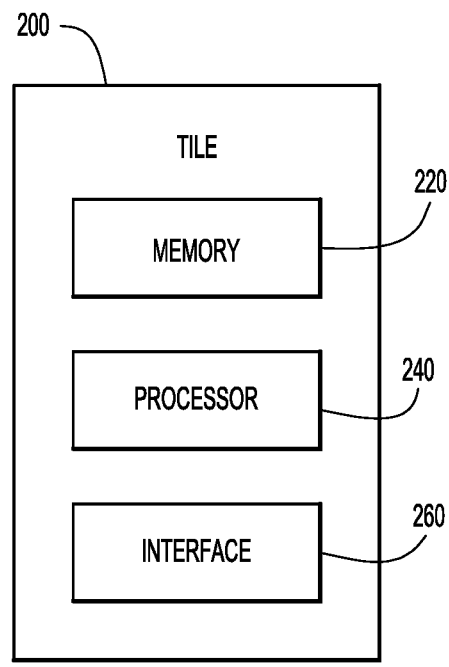
FIG. 2 depicts a tile in accordance with an example embodiment.

FIG. 2 depicts a tile 200 in accordance with an example embodiment. Tile 200 comprises memory 220 (e.g., for storing a given lookup table), a processor 240 for, e.g., executing a query to the memory 220 (i.e., to the given lookup table), and an interface 260 for receiving information related to a lookup and passing resulting looked up information to, e.g., a next tile, via one or more vectors as discussed below.

In accordance with embodiments described herein, a plurality of tiles 200 are logically arranged in a pipeline to process packets and conduct appropriate lookups. In one implementation, the following operation and tables are distributed among a plurality of tiles 200:

L3 destination address (DA) lookup: This involves looking up the IPv4 or IPv6 destination address along with virtual routing and forwarding (VRF) in a table and finding the longest matching prefix. The matched entry either returns a pointer to layer 2 (L2) forwarding information or Equal Cost Multi-Path (ECMP) information.

Equal Cost Multi-Path (ECMP): an ECMP table maintains multiple bundles of L2 forwarding information. If the L3 DA lookup needs to use ECMP, it points to one of the bundles and the packet is forwarded to one of the entries in the selected bundle. The entry is chosen at random using a flow hash.

L2 DA lookup: In the case of routing, either through the L3 DA lookup directly or through the ECMP table lookup a pointer to the L2 entry is obtained that contains the forwarding information for the packet. More specifically, the entry contains a Bridge Domain (BD), an L2 destination address to be re-written in the packet and the output port 25 from which to be sent/transmitted. In the case of bridging, an L2 lookup is performed based on BD and DA to derive the output port 25.

L3 source address (SA) lookup: This lookup may be performed for security. It is performed to make sure the IP source address in the packet is tied to the correct L2 address (L3 bind check) and the source address is arriving on the correct interface (i.e., reverse path forwarding (RPF) check).

Multi-path RPF table: When a packet is forwarded to a destination using one of the multiple paths in an ECMP bundle, the destination can send the packets in the reverse direction and can arrive on any of the multiple paths specified in the ECMP bundle. An RPF check may be used to ensure the packet arrived on one of these valid paths and no other.

L2 SA lookup: This lookup may be performed to "learn" L2 addresses, and to ensure that certain L2 source addresses are arriving on the correct interfaces (i.e., L2 bind check) and ensure the L2 SA and L3 SA binding is correct (i.e., L3 bind check).

S,G lookup: this lookup is employed for multicast forwarding. It involves looking up the pair of IP SA and IP DA in the multicast packets. This is achieved by looking up the SA which returns a SA_tag and the DA which returns a DA_tag and then by looking up the SA_tag and DA_tag pair in the S,G table. This enables the re-use of the tables used for IP lookup and also achieve the same S,G table capacity for IPv6 vs IPv4 because the addresses are reduced to a uniform sized tag.

Figure 3:
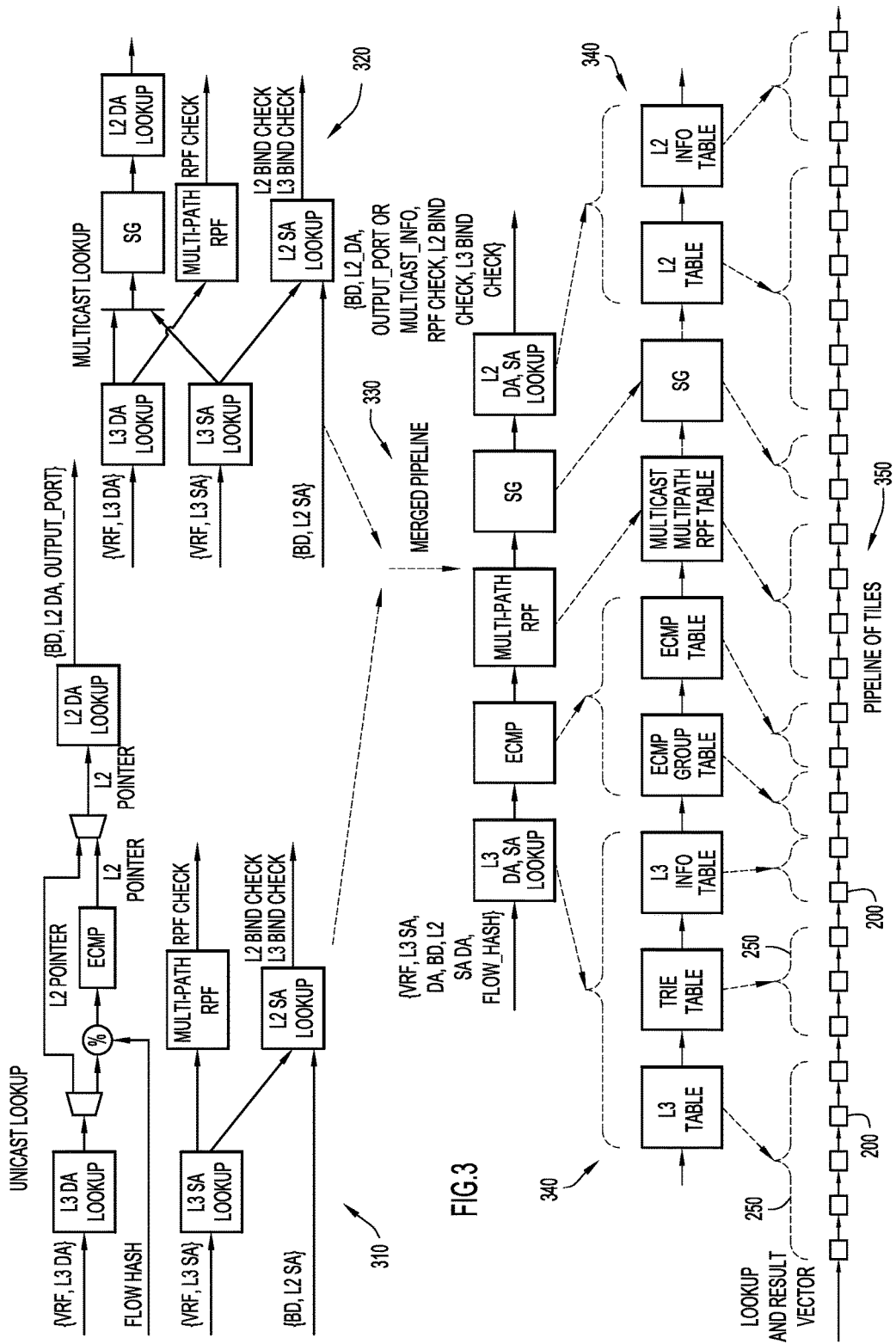
FIG. 3 depicts a merged pipeline of tiles configured to perform a variety of table look ups in accordance with an example embodiment.

In accordance with an embodiment, the above lookup operations are mapped to a pipeline architecture. In this regard, FIG. 3 depicts an example merged pipeline configured to perform a variety of table lookups and processing (i.e., at least those mentioned above) in accordance with an example embodiment. More specifically, FIG. 3 shows lookups and processing associated with a unicast lookup 310, the lookups and processing associated with a multicast lookup 320, and a merged pipeline 330 of the unicast and multicast lookups 310, 320.

Merged pipeline 330 may be distributed into multiple tables 340 as shown in the figure. For example, the L3 SA and DA lookup maps to a L3 lookup table, a Trie table and a L3 info table, the ECMP lookup maps to an ECMP group table and an ECMP table, and the L2 SA and DA lookup maps to a L2 lookup table and a L2 info table.

To implement the multiple tables 340 and allocate memory to them flexibly, a lookup table unit referred to herein as the "tile" 200 is implemented. In accordance with embodiments described herein, individual tiles 200 are configured to perform the following lookup functions.

L3 Table
Trie Table
L3 entry information Table
ECMP Group Table
ECMP Table
RPF Table
SG Table
L2 Table
L2 entry information Table
ACL Key Table (Not shown)
ACL Data Table (Not shown)
NAT table (Not shown)

Further, due to a possibly limited size (memory, processing) of each tile 200, each table or lookup function can be mapped to a set of tiles or "pipeline stage" 250. These pipeline stages 250 are then arranged, logically, into a pipeline of tiles 350 as further shown in FIG. 3.

As a packet is received for routing, it is parsed and all the fields that are to be used for any lookup is packed in a "lookup and result vector" (which can be implemented as a single or separate vectors), and pushed into the pipeline 350. Each pipeline stage 250 consumes the lookup fields it is interested in and produces a result that is merged into the result vector. If a pipeline stage is not supposed to operate on any fields, the lookup and result vector just passes through it without modification. For example, if the packet does not need an ECMP lookup, the vector enters the ECMP tile, comes out unmodified and gets fed to the next pipeline stage 250.

In one implementation, the L3 SA and DA lookup may be performed on the same memory using dual-port accesses because the database to look up such addresses is the same.

On the other hand, ECMP, multi-path and multicast RPF, {S,G} are all single lookup operations, i.e., lookup of these tables occurs only once per packet, and thus dual-port may not be needed.

The L2 SA and DA lookups may be performed on the same memory using dual-port accesses because the database to look up these addresses is the same.

As noted, a series of tiles are stitched together in a pipeline 350. The pipeline 350 carries the lookup vector and lookup results. Each tile 200, if enabled, performs some type of lookup or access that it is configured for and returns the results. If a given tile is disabled, then overall latency through the pipeline 350 is reduced. While many of the operations described herein can be performed with a single tile, when larger/wider lookup keys are used, a pair of tiles may be configured to operate simultaneously. When such a pair-wise configuration is in place, it is also possible to configure the individual tiles within the pair to perform different operations.

Figure 4:
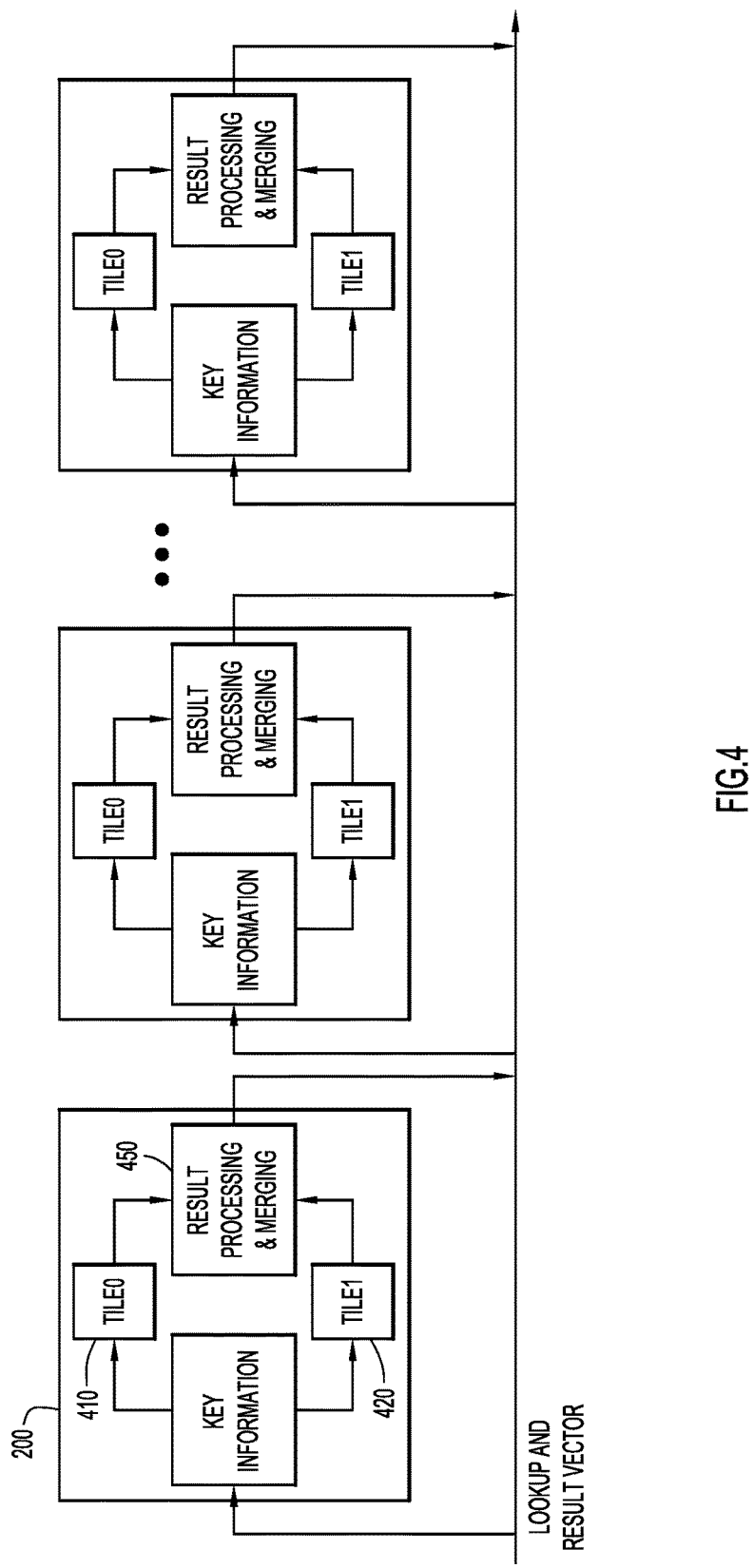
FIG. 4 depicts a more detailed view of several tiles having sub-tiles in accordance with an example embodiment.

FIG. 4 depicts a more detailed view of tiles having sub-tiles in accordance with an example embodiment. As shown in the figure, a pair of tiles Tile0 410 and Tile1 420 are arranged in parallel and are provided the same key information from the lookup and result vector. A processor is then used to perform result processing and merging 450 so that a single result is provided to the lookup and result vector. Those skilled in the art will appreciate that a "single" result may actually comprise multiple pieces of information that are provided to the lookup and result vector as a result of the parallel lookups in tiles 410 and 420.

In accordance with an embodiment, each tile can be configured to perform an operation that involves memory accesses for associative lookup and direct indexing, described more fully below.

In an associative lookup, some fields from the lookup and result vector are selected to form an associative lookup key, mask some arbitrary number of bits in the key, apply a hash function on the resultant key and use the hash value as the index into the tile for reading data. Each tile can be configured to use one of multiple hash functions. The width of the key over which the hash function is applied may be constant, but depending on the function that is performed, the key field can be different.

An associative lookup table requiring a key wider than a single tile width can be constructed using a pair of tiles and splitting the key to lay it out on the same row index of the two tiles. For example, while an IPv4 lookup key might fit in one tile, an IPv6 lookup key might need to use a tile-pair. The tiles in this tile-pair are arranged to be side-by-side and to be looked up in parallel. The tiles 410, 420 in FIG. 4 may be used for this purpose.

An associative lookup table in which there is a {key,data} pair and where data cannot fit in the same tile along with the key can be implemented by splitting key and data and keeping them in separate tiles. In one implementation, first the key is looked up in a key tile. If there is a match, the "hit index" of the key tile can be used to access the associated data in a related data tile. That is, for each key entry in the key tile, there is a corresponding data entry in the data tile. In this way, a table can be made arbitrarily wide and laid over multiple tiles. It is not necessary to have these key and data tiles side by side. The hit index from the key tile is inserted in the pipeline and further down the pipeline 350 the associated data tile consumes the hit index and produces the data that is merged in the pipeline 350.

With direct indexing there is a direct index into the tile to read the contents. The index can be split into two parts, e.g., row and column. The entire row may be read from the tile using the row index and a specific column chosen by the column index can be used for computation. The number of columns in a row required for a function can vary.

Figure 5:
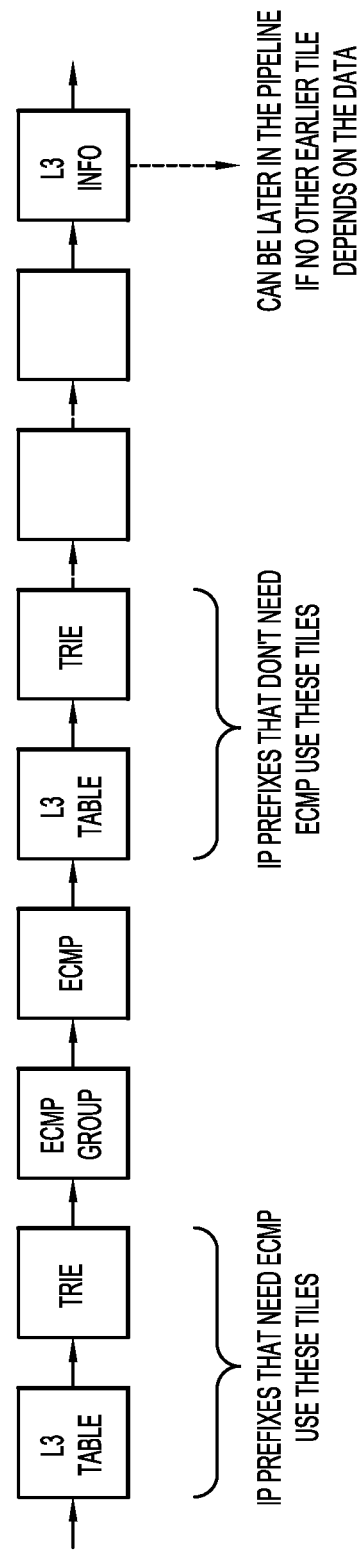
FIG. 5 depicts a portion of a pipeline to facilitate explanation of an ordering of selected tiles in accordance with an example embodiment.

FIG. 5 depicts a portion of a pipeline to facilitate explanation of an ordering of selected tiles in accordance with an example embodiment. As shown in the figure, the L3 info tile can be far apart from the L3 lookup or Trie tiles since nothing before the L3 info tile depends on the L3 info tile. Therefore, and generally, as long as the dependencies between the entries among different tables is respected, tiles can be placed anywhere in the pipeline 350.

FIG. 5 shows still another example of tiles being separated from each other. Specifically, it is not necessary to have all the L3 and Trie tiles arranged before the ECMP table tile(s). Only those L3 entries that need subsequent ECMP lookup need to be placed in the tiles before ECMP tiles. Other L3/Trie entries can reside in tiles arranged after the ECMP tiles.

It is noted that a logically deep table can also be implemented by allocating multiple tiles to perform the same functionality.

Each type of lookup can rely on multiple lookups per clock cycles or on only a single lookup. For example, for an IP lookup, both the Longest Prefix Match for the destination address for forwarding and the source IP address for security (RPF, L3 bind) may be needed. As such, an IP lookup may employ dual-port memory access to provide the desired lookup bandwidth whereas some other lookups such as ECMP or RPF may need only one memory access (either on source or on destination IP address).

Figure 6A:
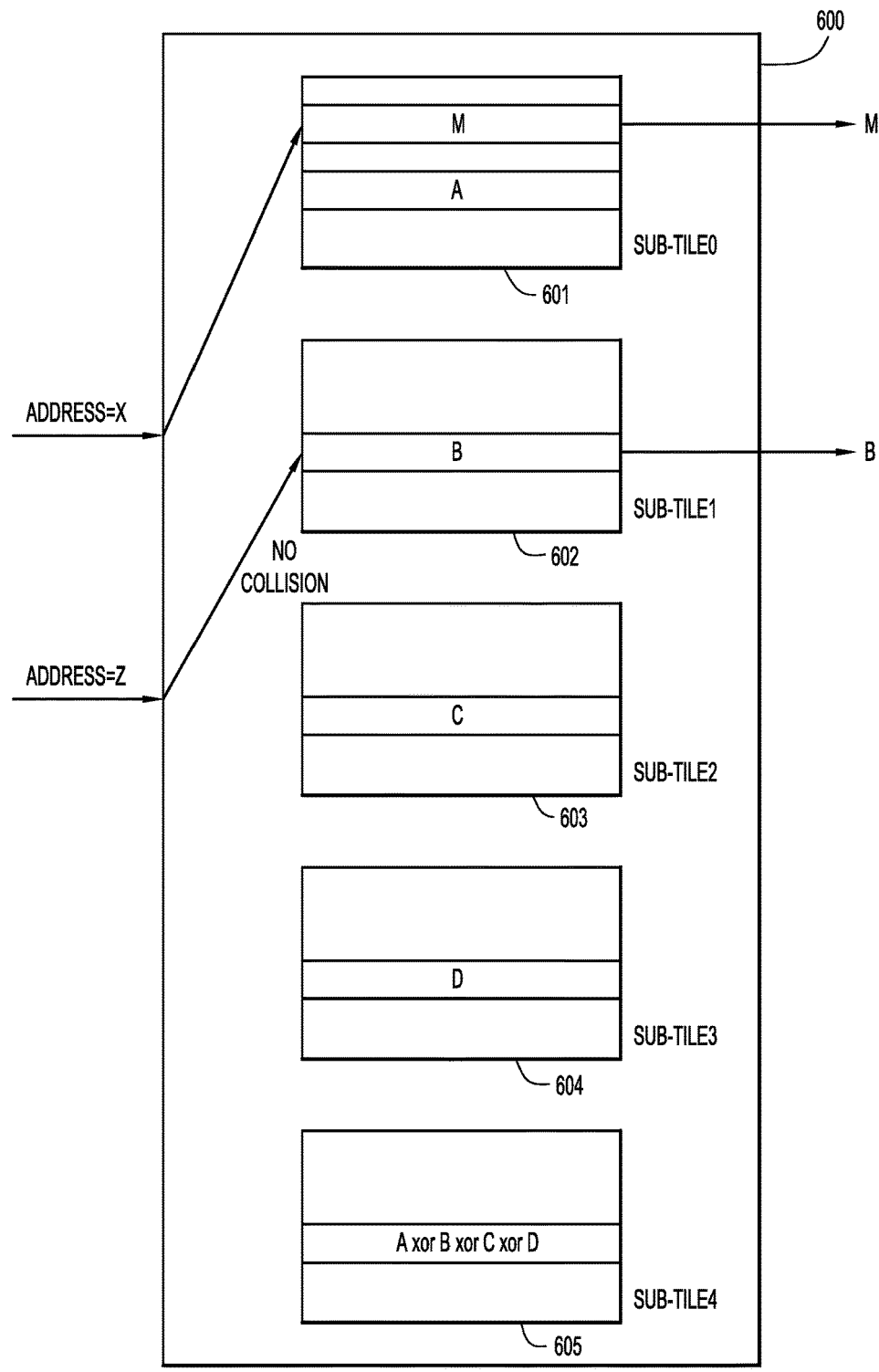
FIGS. 6A and 6B depict a mechanism that avoids memory access collisions in a group of sub-tiles in accordance with an example embodiment.
Figure 6B:
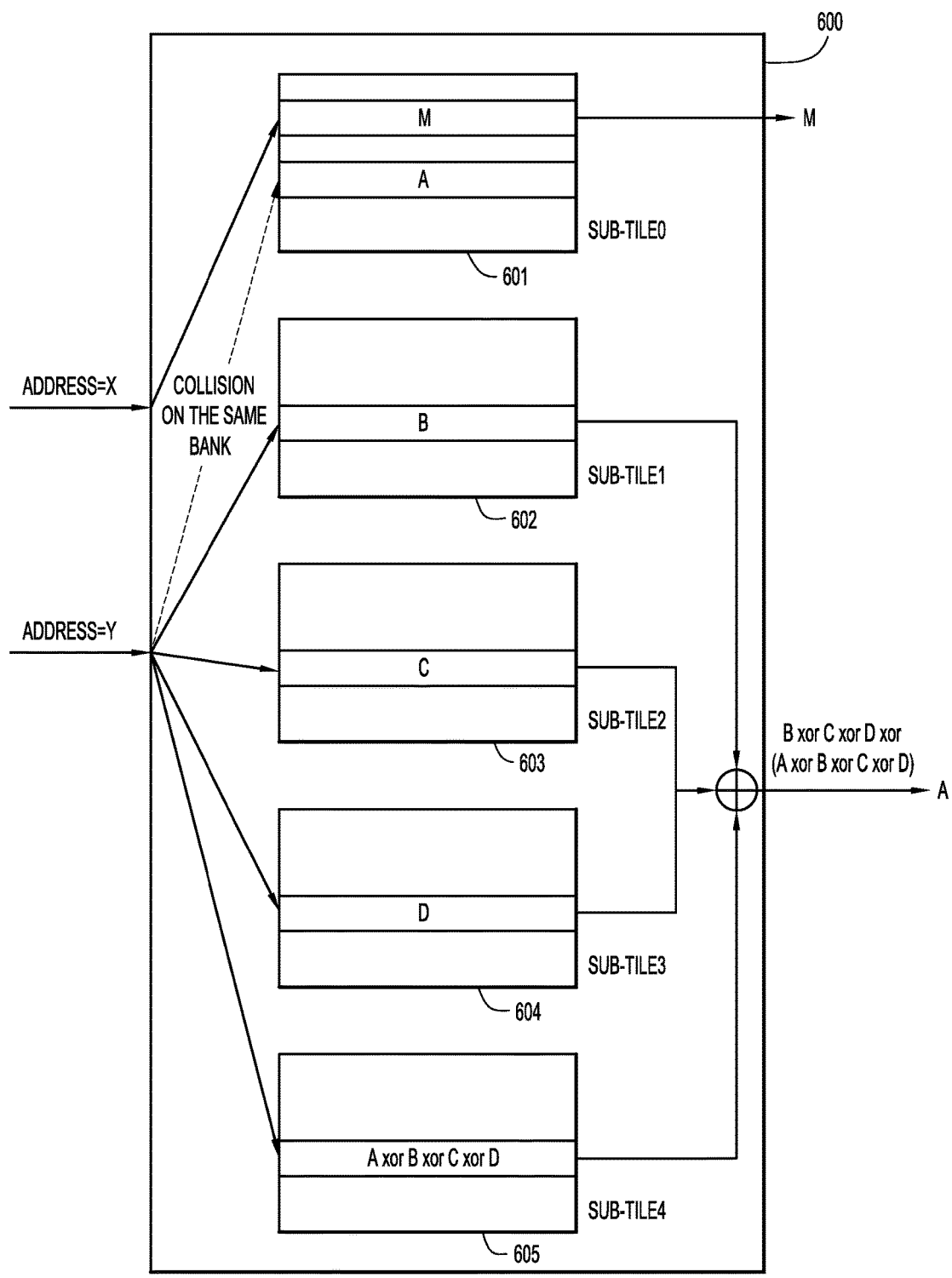

With the foregoing in mind, reference may be made to FIGS. 6A and 6B, which depict a mechanism that avoids memory access collisions in a group of sub-tiles for which dual access may be implemented in accordance with an example embodiment.

More specifically, as shown in FIGS. 6A, 6B, a tile may be configured to support dual-port read access. This may be implemented using multiple smaller "sub-tiles" 601-605 (e.g., more than two) to construct a given tile 600. One of the sub-tiles, 605, is designated as an XOR tile. Each row in XOR tile 605 is configured to contain the bitwise XOR of the information in the remaining sub-tiles 601-604 at the same row.

In operation, and as shown in FIG. 6A, a dual read access of tile 600 results in the sub-tiles 601 and 602 being accessed via addresses X and Z. As such, no collision occurs. Contents M, corresponding to address X, and contents B, corresponding to address Z, is obtained from the lookup. However, as shown in FIG. 6B, the addresses X and Y resolve to the same sub-tile 601, leading to a collision. In a dual port read access where the two read addresses collide at a same sub-tile (e.g., 601 in FIG. 6B), one of the read accesses is satisfied by sub-tile 601 and the other access is satisfied by reading the information from the remaining banks at the desired row and XORing them. That is, the contents at the same address in each of sub-tiles 602-605 is XORed such that the desired contents A is obtained. This is possible by maintaining XOR tile 605.

When the dual-port functionality of a tile is not in use, all the sub-tile ports may be exposed to the lookup function thereby providing N times the memory bandwidth or a memory word that is N-times wider compared to a single sub-tile. This is useful in connection with configuring the tile for hash table lookup (used for RPF, SG lookups) because the associativity of the lookup increases N times thereby reducing hash collisions.

Figure 7:
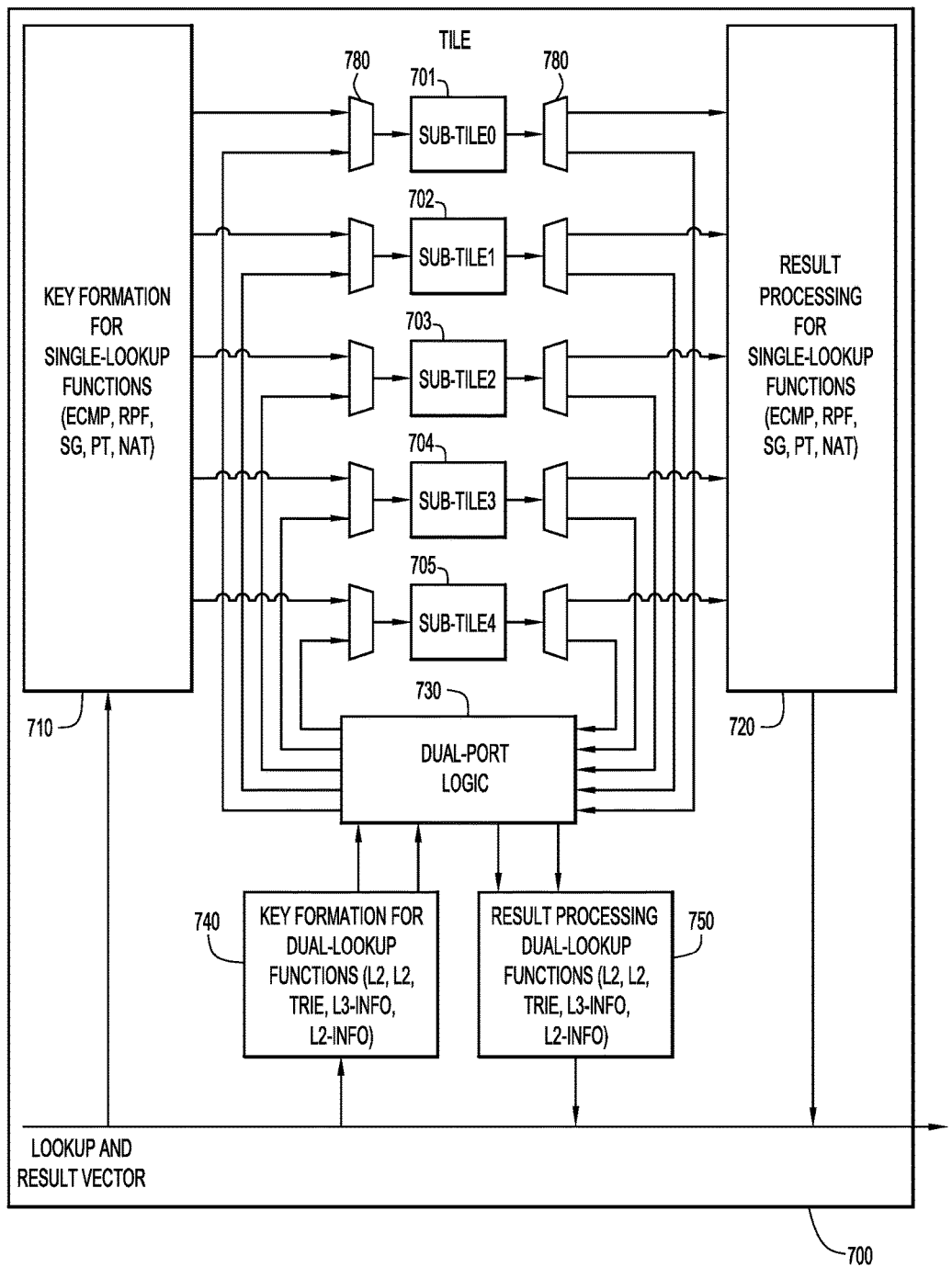
FIG. 7 is a more detailed illustration of a tile with multiple sub-tiles in accordance with an example embodiment.

FIG. 7 is a more detailed illustration of a tile 700 with multiple sub-tiles in accordance with an example embodiment. As shown, tile 700 may be configured for single lookup or for dual lookup functions. Sub-tiles 701-705 are in communication with receive module 710 to receive key information for a single lookup, and with processing module 720 for processing the result of the single lookup. At the same time, dual port logic 730 may be employed to both receive key information for a dual lookup function from the lookup and result vector, and to process results from the dual lookup function and provide the same to the lookup and result vector. Multiplexors 780 control whether the individual tiles 701-705 communicate with modules 710, 720, or with dual port logic 730.

Figure 8A:
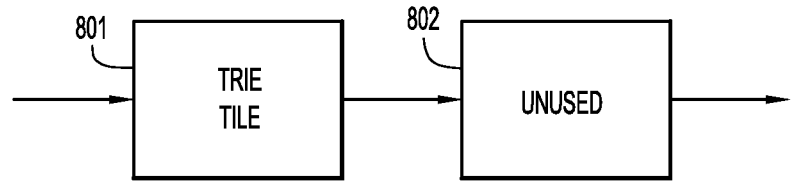
FIGS. 8A-8D illustrate the ability to reconfigure a given tile and/or shift functionality from one tile to another in accordance with an example embodiment
Figure 8B:
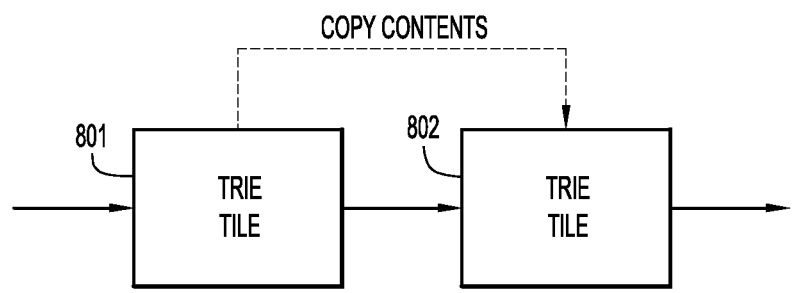
Figure 8C:
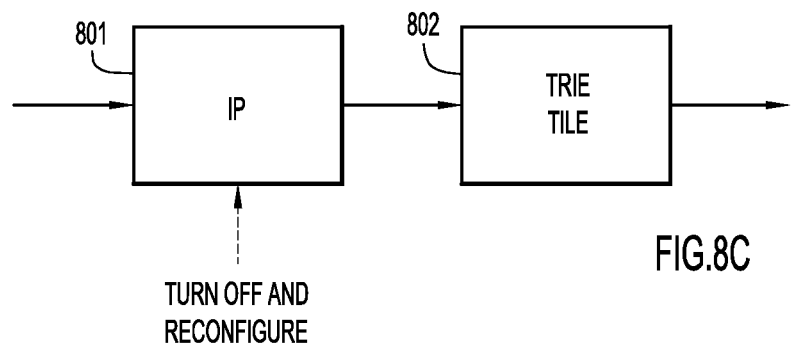
Figure 8D:
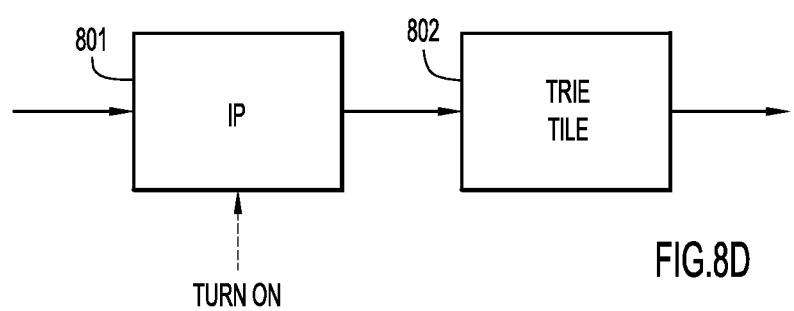

FIGS. 8A-8D illustrate the ability to reconfigure a given tile and/or shift functionality from one tile to another in accordance with an example embodiment. To implement such functionality, two different tiles can contain duplicate entries. Also, a tile can also be entirely turned off in which case the lookup and result vector that enters the tile traverses the tile without modification. Duplicate entries and the ability to enable/turn on or disable/turn off a given tile makes it possible to re-configure tiles dynamically without disruption to ongoing packet processing. For example, suppose there are two tiles with one tile 801 used for a Trie table and another tile 802 that is unused (FIG. 8A), and it is desired to use the Trie table tile 801 for new IP address entries. This can be accomplished, as seen in FIG. 8B, by copying the contents of the Trie tile 801 into the unused tile 802. At this point both tiles have identical entries, and this is acceptable as it is permitted to have different tiles have duplicate entries, as noted above. After the copy/duplication operation, tile 801 can be turned off and re-configured for IP key lookup, FIG. 8C. Once re-configured, tile 801 it is turned back on, FIG. 8D. Thus, as those skilled in the art will appreciate, tiles can be moved around and reconfigured with the help of some un-used tiles.

Figure 9:
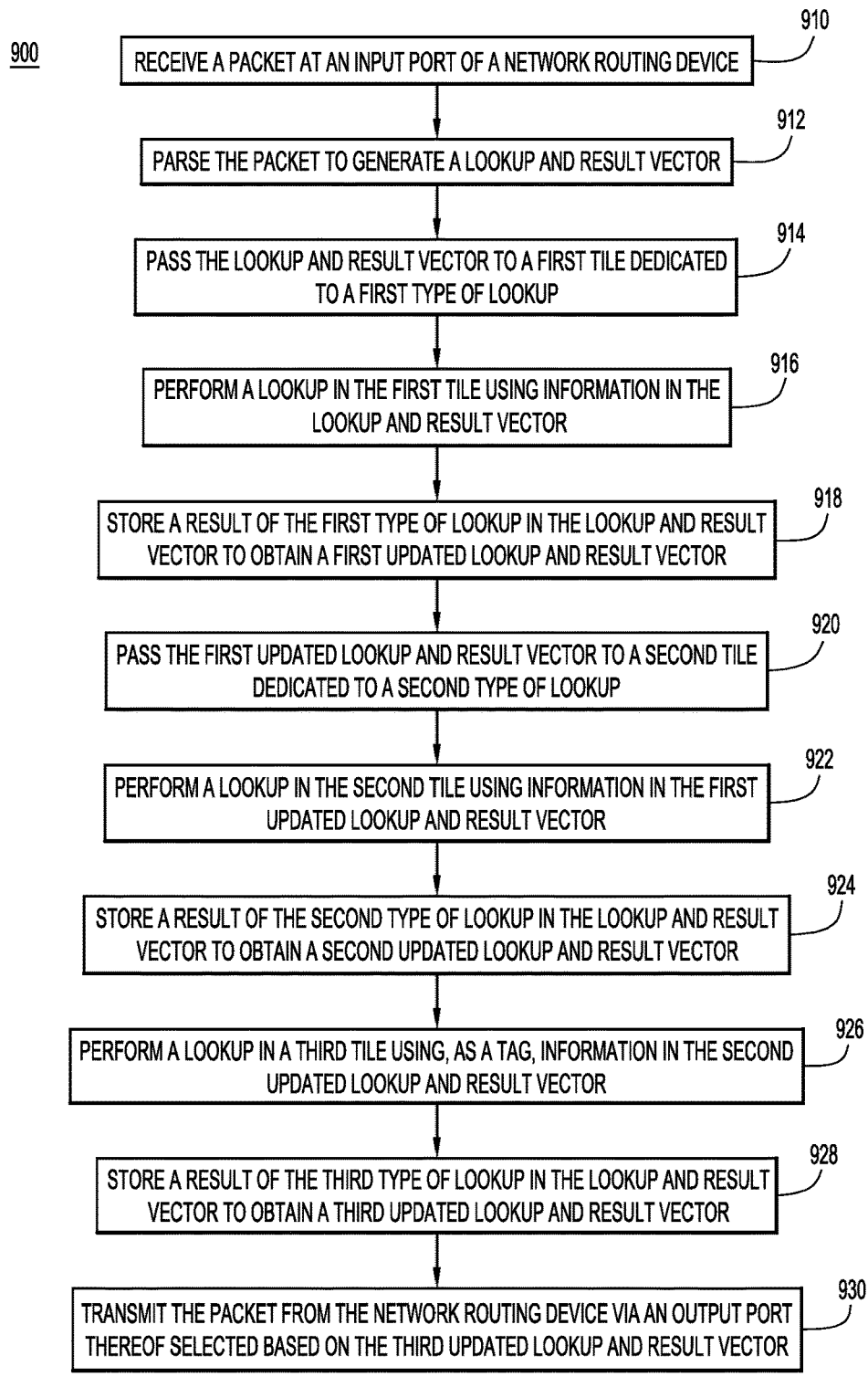
FIG. 9 is a flow chart depicting a series of operation for performing packet processing in accordance with an example embodiment

FIG. 9 is a flow chart depicting a series of operation for performing packet processing/routing in accordance with an example embodiment. Operations 900 begin with 910 at a packet is received at an input port of a network routing device. At 912, the packet is parsed to generate a lookup and result vector. At 914, the lookup and result vector is passed to a first tile dedicated to a first type of lookup. At 916, a lookup is performed in the first tile using information in the lookup and result vector. At 918, a result of the first type of lookup is stored in the lookup and result vector to obtain a first updated lookup and result vector. At 920, the first updated lookup and result vector is passed to a second tile dedicated to a second type of lookup. At 922, a lookup in the second tile is performed using information in the first updated lookup and result vector. At 924, a result of the second type of lookup is stored in the lookup and result vector to obtain a second updated lookup and result vector. At 926, a lookup in a third tile is performed using, as a tag, information in the second updated lookup and result vector. At 928, a result of the third type of lookup is stored in the lookup and result vector to obtain a third updated lookup and result vector. At 930, the packet is transmitted from the network routing device via an output port thereof selected based on the third updated lookup and result vector.

Figure 10:
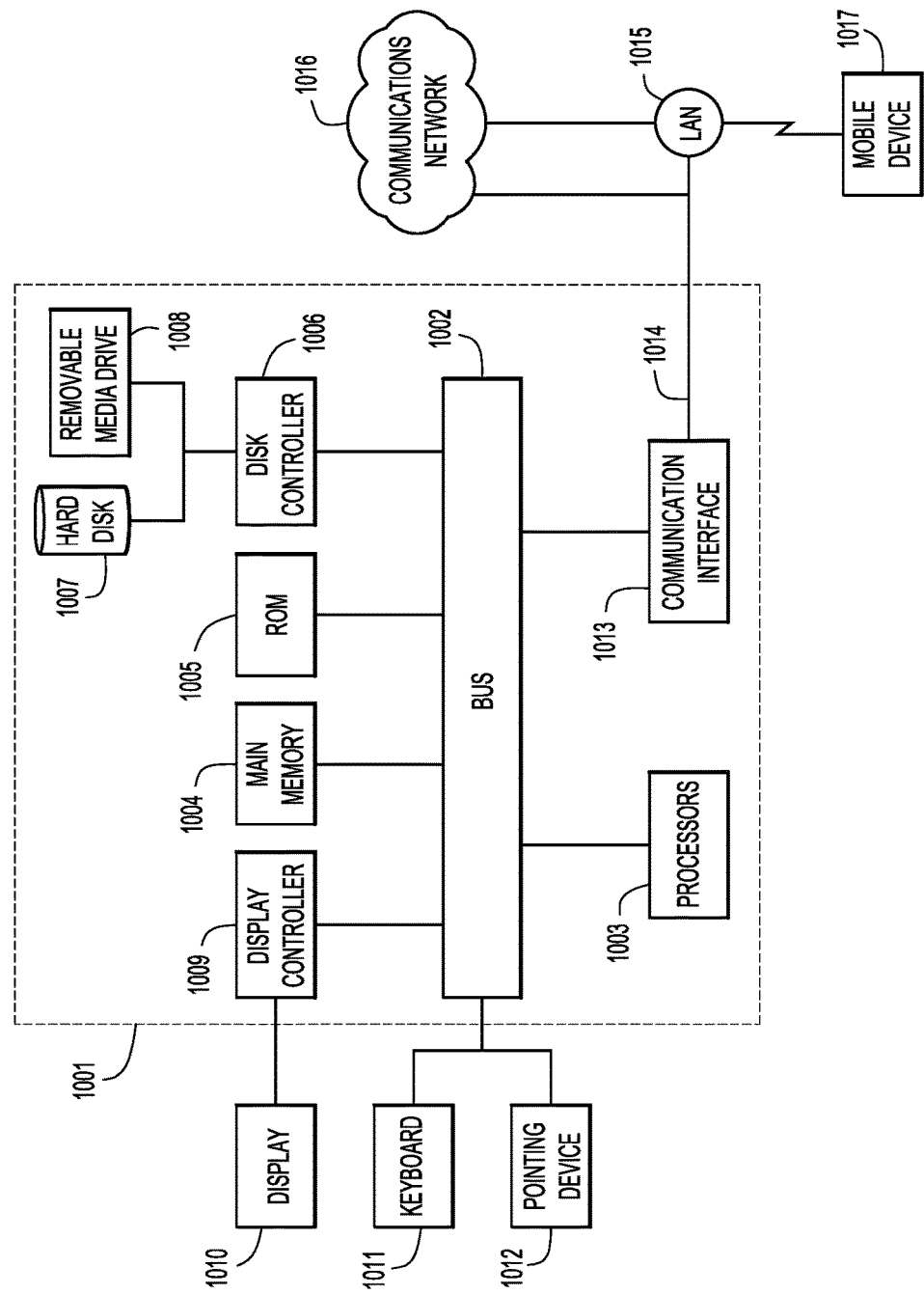
FIG. 10 depicts a device on which the embodiments may be implemented.

FIG. 10 depicts an apparatus, e.g., router 10, that is configured to operate with tiles implemented on a ASIC according to an example embodiment. The apparatus may be implemented on a computer system 1001. The computer system 1001 may be programmed to implement a computer based device. The computer system 1001 includes a bus 1002 or other communication mechanism for communicating information, and a processor 1003 coupled with the bus 1002 for processing the information. While the figure shows a single block 1003 for a processor, it should be understood that the processor 1003 represents a plurality of processors or processing cores, each of which can perform separate processing. The computer system 1001 may also include a main memory 1004, such as a random access memory (RAM) or other dynamic storage device (e.g., dynamic RAM (DRAM), static RAM (SRAM), and synchronous DRAM (SD RAM)), coupled to the bus 1002 for storing information and instructions to be executed by processor 1003. In addition, the main memory 1004 may be used for storing temporary variables or other intermediate information during the execution of instructions by the processor 1003.

The computer system 1001 may further include a read only memory (ROM) 1005 or other static storage device (e.g., programmable ROM (PROM), erasable PROM (EPROM), and electrically erasable PROM (EEPROM)) coupled to the bus 1002 for storing static information and instructions for the processor 1003.

The computer system 1001 may also include a disk controller 1006 coupled to the bus 1002 to control one or more storage devices for storing information and instructions, such as a magnetic hard disk 1007, and a removable media drive 1008 (e.g., floppy disk drive, read-only compact disc drive, read/write compact disc drive, compact disc jukebox, tape drive, and removable magneto-optical drive). The storage devices may be added to the computer system 701 using an appropriate device interface (e.g., small computer system interface (SCSI), integrated device electronics (IDE), enhanced-IDE (E-IDE), direct memory access (DMA), or ultra-DMA).

The computer system 1001 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)), that, in addition to microprocessors and digital signal processors may individually, or collectively, are types of processing circuitry. The processing circuitry may be located in one device or distributed across multiple devices. In the instant implementation, the ASICs may comprise the pipeline of tiles.

The computer system 1001 may also include a display controller 1009 coupled to the bus 1002 to control a display 1010, such as a cathode ray tube (CRT) or liquid crystal display (LCD), for displaying information to a computer user. The computer system 1001 may include input devices, such as a keyboard 1011 and a pointing device 1012, for interacting with a computer user and providing information to the processor 1003. The pointing device 1012, for example, may be a mouse, a trackball, or a pointing stick for communicating direction information and command selections to the processor 1003 and for controlling cursor movement on the display 1010. In addition, a printer may provide printed listings of data stored and/or generated by the computer system 1001.

The computer system 1001 performs a portion or all of the processing operations of the embodiments described herein in response to the processor 1003 executing one or more sequences of one or more instructions contained in a memory, such as the main memory 1004. Such instructions may be read into the main memory 1004 from another computer readable medium, such as a hard disk 1007 or a removable media drive 1008. One or more processors in a multi-processing arrangement may also be employed to execute the sequences of instructions contained in main memory 1004. In alternative embodiments, hard-wired circuitry may be used in place of or in combination with software instructions. Thus, embodiments are not limited to any specific combination of hardware circuitry and software.

As stated above, the computer system 1001 includes at least one computer readable medium or memory for holding instructions programmed according to the embodiments presented, for containing data structures, tables, records, or other data described herein. Examples of computer readable media are compact discs, hard disks, floppy disks, tape, magneto-optical disks, PROMs (EPROM, EEPROM, flash EPROM), DRAM, SRAM, SD RAM, or any other magnetic medium, compact discs (e.g., CD-ROM), or any other optical medium, punch cards, paper tape, or other physical medium with patterns of holes, or any other medium from which a computer can read.

Stored on any one or on a combination of non-transitory computer readable storage media, embodiments presented herein include software for controlling the computer system 1001, for driving a device or devices for implementing the described embodiments, and for enabling the computer system 1001 to interact with a human user. Such software may include, but is not limited to, device drivers, operating systems, development tools, and applications software. Such computer readable storage media further includes a computer program product for performing all or a portion (if processing is distributed) of the processing presented herein.

The computer code may be any interpretable or executable code mechanism, including but not limited to scripts, interpretable programs, dynamic link libraries (DLLs), Java classes, and complete executable programs. Moreover, parts of the processing may be distributed for better performance, reliability, and/or cost.

The computer system 1001 also includes a communication interface 1013 coupled to the bus 1002. The communication interface 1013 provides a two-way data communication coupling to a network link 1014 that is connected to, for example, a local area network (LAN) 1015, or to another communications network 1016. For example, the communication interface 1013 may be a wired or wireless network interface card or modem (e.g., with SIM card) configured to attach to any packet switched (wired or wireless) LAN or WWAN. As another example, the communication interface 1013 may be an asymmetrical digital subscriber line (ADSL) card, an integrated services digital network (ISDN) card or a modem to provide a data communication connection to a corresponding type of communications line. Wireless links may also be implemented. In any such implementation, the communication interface 1013 sends and receives electrical, electromagnetic or optical signals that carry digital data streams representing various types of information.

The network link 1014 typically provides data communication through one or more networks to other data devices. For example, the network link 1014 may provide a connection to another computer through a local are network 1015 (e.g., a LAN) or through equipment operated by a service provider, which provides communication services through a communications network 1016. The local network 1014 and the communications network 1016 use, for example, electrical, electromagnetic, or optical signals that carry digital data streams, and the associated physical layer (e.g., CAT 5 cable, coaxial cable, optical fiber, etc.). The signals through the various networks and the signals on the network link 1014 and through the communication interface 1013, which carry the digital data to and from the computer system 1001 may be implemented in baseband signals, or carrier wave based signals. The baseband signals convey the digital data as unmodulated electrical pulses that are descriptive of a stream of digital data bits, where the term "bits" is to be construed broadly to mean symbol, where each symbol conveys at least one or more information bits. The digital data may also be used to modulate a carrier wave, such as with amplitude, phase and/or frequency shift keyed signals that are propagated over a conductive media, or transmitted as electromagnetic waves through a propagation medium. Thus, the digital data may be sent as unmodulated baseband data through a "wired" communication channel and/or sent within a predetermined frequency band, different than baseband, by modulating a carrier wave. The computer system 1001 can transmit and receive data, including program code, through the network(s) 1015 and 1016, the network link 1014 and the communication interface 1013. Moreover, the network link 1014 may provide a connection to a mobile device 1017 such as a personal digital assistant (PDA) laptop computer, cellular telephone, or modem and SIM card integrated with a given device.

In sum, the embodiments described herein provide a structure (implemented on, e.g., an ASIC) that provides a packet forwarding pipeline that provides flexibility in memory allocation to different operations such as L3, L2, NAT, and ACL lookups. The described architecture is less bulky than fully programmable architectures and can perform predefined lookups efficiently.

In one form, a method is provided comprising: receiving a packet at an input port of a network device; parsing the packet to generate a lookup and result vector; passing the lookup and result vector to a first tile dedicated to a first type of lookup; performing a lookup in the first tile using information in the lookup and result vector; storing a result of the first type of lookup in the lookup and result vector to obtain a first updated lookup and result vector; passing the first updated lookup and result vector to a second tile dedicated to a second type of lookup; performing a lookup in the second tile using information in the first updated lookup and result vector; storing a result of the second type of lookup in the lookup and result vector to obtain a second updated lookup and result vector; performing a lookup in a third tile using, as a tag, information in the second updated lookup and result vector; storing a result of the third type of lookup in the lookup and result vector to obtain a third updated lookup and result vector; and transmitting the packet from the network routing device via an output port thereof selected based on the third updated lookup and result vector.

In another form, an apparatus or device is provided comprising: at least one input port and at least one output port; a memory; and one or more processors coupled to the at least one input port and at least one output port, and the memory, and configured to: receive a packet at the input port of the device; parse the packet to generate a lookup and result vector; pass the lookup and result vector to a first tile dedicated to a first type of lookup; perform a lookup in the first tile using information in the lookup and result vector; store a result of the first type of lookup in the lookup and result vector to obtain a first updated lookup and result vector; pass the first updated lookup and result vector to a second tile dedicated to a second type of lookup; perform a lookup in the second tile using information in the first updated lookup and result vector; store a result of the second type of lookup in the lookup and result vector to obtain a second updated lookup and result vector; perform a lookup in a third tile using, as a tag, information in the second updated lookup and result vector; store a result of the third type of lookup in the lookup and result vector to obtain a third updated lookup and result vector; and transmit the packet from the output port of the device selected based on the third updated lookup and result vector.

In still another form, one or more non-transitory computer readable storage media encoded with software comprising computer executable instructions and when the software is executed operable to: receive a packet at an input port of a network device; parse the packet to generate a lookup and result vector; pass the lookup and result vector to a first tile dedicated to a first type of lookup; perform a lookup in the first tile using information in the lookup and result vector; store a result of the first type of lookup in the lookup and result vector to obtain a first updated lookup and result vector; pass the first updated lookup and result vector to a second tile dedicated to a second type of lookup; perform a lookup in the second tile using information in the first updated lookup and result vector; store a result of the second type of lookup in the lookup and result vector to obtain a second updated lookup and result vector; perform a lookup in a third tile using, as a tag, information in the second updated lookup and result vector; store a result of the third type of lookup in the lookup and result vector to obtain a third updated lookup and result vector; and transmit the packet from an output port of the network device selected based on the third updated lookup and result vector.

The above description is intended by way of example only. Various modifications and structural changes may be made therein without departing from the scope of the concepts described herein and within the scope and range of equivalents of the claims.

What is claimed is:

1. A method comprising:
receiving a packet at an input port of a network device;
parsing the packet to generate a lookup and result vector;
passing the lookup and result vector to a first tile dedicated to a first type of lookup;
performing a lookup in the first tile using information in the lookup and result vector;
storing a result of the first type of lookup in the lookup and result vector to obtain a first updated lookup and result vector;
passing the first updated lookup and result vector to a second tile dedicated to a second type of lookup;
performing a lookup in the second tile using information in the first updated lookup and result vector;
storing a result of the second type of lookup in the lookup and result vector to obtain a second updated lookup and result vector;
performing a lookup in a third tile using, as a tag, information in the second updated lookup and result vector;
storing a result of the third type of lookup in the lookup and result vector to obtain a third updated lookup and result vector; and
transmitting the packet from the network device via an output port thereof selected based on the third updated lookup and result vector,
wherein at least one of the first, second or third tiles comprises a pair of sub-tiles that are provided same key information for lookup in the first, second or third tiles, respectively,
wherein performing the lookup in the first tile comprises performing a dual read access of the first tile, and
wherein the first tile comprises a plurality of sub-tiles, each of the sub-tiles comprises memory accessible via addressable rows and one of the sub-tiles is a dedicated XOR sub-tile that comprises in each addressable row thereof a result of an XOR operation of same respective rows in remaining sub-tiles of the first tile, the method further comprising:
detecting that, during the dual read access, a read collision is to occur at one of the remaining sub-tiles, and in response to the read collision performing an XOR operation on contents of a memory address of all sub-tiles except for the one of the remaining sub-tiles corresponding to a memory address that cannot be accessed due to the read collision.

2. The method of claim 1, wherein the first type of lookup comprises one of a Layer 3 destination address lookup, a Layer 2 equal cost multi-path lookup, a Layer 2 destination address lookup, a Layer 3 source address lookup, a multi-path reverse path forwarding (RPF) lookup, a Layer 2 source address lookup, or a multicast (S, G) lookup.

3. The method of claim 1, wherein the dual read access is enabled by dual port logic in the first tile.

4. The method of claim 1, further comprising dynamically enabling and disabling at least one of the first tile or the second tile.

5. The method of claim 4, wherein while the first tile is disabled, copying contents of the first tile to a fourth tile.

6. The method of claim 5, further comprising storing new contents in the first tile and enabling the first tile.

7. The method of claim 1, wherein the first tile comprises a pair of tiles, and the operation of performing a lookup in the first tile comprises performing a lookup in the pair of tiles simultaneously.

8. A device comprising:
at least one input port and at least one output port;
a memory; and
one or more processors coupled to the at least one input port and at least one output port and the memory, and configured to:
receive a packet at the input port of the device;
parse the packet to generate a lookup and result vector;
pass the lookup and result vector to a first tile dedicated to a first type of lookup;
perform a lookup in the first tile using information in the lookup and result vector;
store a result of the first type of lookup in the lookup and result vector to obtain a first updated lookup and result vector;
pass the first updated lookup and result vector to a second tile dedicated to a second type of lookup;
perform a lookup in the second tile using information in the first updated lookup and result vector;
store a result of the second type of lookup in the lookup and result vector to obtain a second updated lookup and result vector;
perform a lookup in a third tile using, as a tag, information in the second updated lookup and result vector;
store a result of the third type of lookup in the lookup and result vector to obtain a third updated lookup and result vector; and
transmit the packet from the output port of the device selected based on the third updated lookup and result vector,
wherein at least one of the first, second or third tiles comprises a pair of sub-tiles that are provided same key information for lookup in the first, second or third tiles, respectively,
wherein the processor is configured to perform the lookup in the first tile by performing a dual read access of the first tile, and
wherein the first tile comprises a plurality of sub-tiles, each of the sub-tiles comprises memory accessible via addressable rows and one of the sub-tiles is a dedicated XOR sub-tile that comprises in each addressable row thereof a result of an XOR operation of same respective rows in remaining sub-tiles of the first tile, the processor further configured to:
detect that, during the dual read access, a read collision is to occur at one of the remaining sub-tiles, and in response to the read collision perform an XOR operation on contents of a memory address of all sub-tiles except for the one of the remaining sub-tiles corresponding to a memory address that cannot be accessed due to the read collision.

9. The device of claim 8, wherein the first type of lookup comprises one of a Layer 3 destination address lookup, a Layer 2 equal cost multi-path lookup, a Layer 2 destination address lookup, a Layer 3 source address lookup, a multi-path reverse path forwarding (RPF) lookup, a Layer 2 source address lookup, or a multicast (S, G) lookup.

10. The device of claim 8, wherein the dual read access is enabled by dual port logic in the first tile.

11. The device of claim 8, wherein the first tile comprises a pair of tiles, and the processor is configured to perform a lookup in the first tile by performing a lookup in the pair of tiles simultaneously.

12. One or more non-transitory computer readable storage media encoded with software comprising computer executable instructions and, when the software is executed by a processor, the processor is operable to:
receive a packet at an input port of a network device;
parse the packet to generate a lookup and result vector;
pass the lookup and result vector to a first tile dedicated to a first type of lookup;
perform a lookup in the first tile using information in the lookup and result vector;
store a result of the first type of lookup in the lookup and result vector to obtain a first updated lookup and result vector;
pass the first updated lookup and result vector to a second tile dedicated to a second type of lookup;
perform a lookup in the second tile using information in the first updated lookup and result vector;
store a result of the second type of lookup in the lookup and result vector to obtain a second updated lookup and result vector;
perform a lookup in a third tile using, as a tag, information in the second updated lookup and result vector;
store a result of the third type of lookup in the lookup and result vector to obtain a third updated lookup and result vector; and
transmit the packet from an output port of the network device selected based on the third updated lookup and result vector,
wherein at least one of the first, second or third tiles comprises a pair of sub-tiles that are provided same key information for lookup in the first, second or third tiles, respectively,
wherein the processor performs the lookup in the first tile by performing a dual read access of the first tile, and
wherein the first tile comprises a plurality of sub-tiles, each of the sub-tiles comprises memory accessible via addressable rows and one of the sub-tiles is a dedicated XOR sub-tile that comprises in each addressable row thereof a result of an XOR operation of same respective rows in remaining sub-tiles of the first tile, the instructions operable to:
detect that, during the dual read access, a read collision is to occur at one of the remaining sub-tiles, and in response to the read collision perform an XOR operation on contents of a memory address of all sub-tiles except for the one of the remaining sub-tiles corresponding to a memory address that cannot be accessed due to the read collision.

13. The non-transitory computer readable storage media of claim 12, wherein the first type of lookup comprises one of a Layer 3 destination address lookup, a Layer 2 equal cost multi-path lookup, a Layer 2 destination address lookup, a Layer 3 source address lookup, a multi-path reverse path forwarding (RPF) lookup, a Layer 2 source address lookup, or a multicast (S, G) lookup.

* * * * *